(12) United States Patent
Thomas et al.

(10) Patent No.: US 7,070,845 B2
(45) Date of Patent: Jul. 4, 2006

(54) FLUID-FILLED BLADDER FOR AN ARTICLE OF FOOTWEAR

(75) Inventors: Edward N. Thomas, Portland, OR (US); David Goodwin, Portland, OR (US)

(73) Assignee: NIKE, Inc., Beaverton, OR (US)

(*) Notice: Subject to any disclaimer, the term of this patent is extended or adjusted under 35 U.S.C. 154(b) by 24 days.

(21) Appl. No.: 10/642,262

(22) Filed: Aug. 18, 2003

(65) Prior Publication Data

US 2005/0039346 A1 Feb. 24, 2005

(51) Int. Cl.
B32B 1/04 (2006.01)
A43B 13/20 (2006.01)

(52) U.S. Cl. .............. 428/69; 428/71; 428/86; 36/29

(58) Field of Classification Search .......... 36/28, 36/29, 71, 35 R
See application file for complete search history.

(56) References Cited

U.S. PATENT DOCUMENTS

| | | | |
|---|---|---|---|
| 3,583,081 A | 6/1971 | Hayashi | |
| 4,183,156 A | 1/1980 | Rudy | |
| 4,219,945 A | 9/1980 | Rudy | |
| 4,513,449 A | 4/1985 | Donzis | |
| 4,874,640 A | 10/1989 | Donzis | |
| 4,906,502 A | 3/1990 | Rudy | |
| 5,083,361 A | 1/1992 | Rudy | |
| 5,543,194 A | 8/1996 | Rudy | |
| 5,741,568 A * | 4/1998 | Rudy | 428/69 |
| 5,993,585 A | 11/1999 | Goodwin et al. | |
| 6,119,371 A | 9/2000 | Goodwin et al. | |
| 6,127,010 A | 10/2000 | Rudy | |

FOREIGN PATENT DOCUMENTS

EP 1 371 762 12/2003

* cited by examiner

Primary Examiner—Ted Kavanaugh
(74) Attorney, Agent, or Firm—Banner & Witcoff, Ltd.

(57) ABSTRACT

The invention relates to a fluid-filled bladder and a method for making for making a fluid-filled bladder that include a core having at least one fusing filament. A portion of the fusing filament is positioned adjacent to the exterior surface of the core such that it engages and fuses to barrier layers of the bladder, thereby securing the core to the barrier layers without the need for an additional fusing agent therebetween.

25 Claims, 2 Drawing Sheets

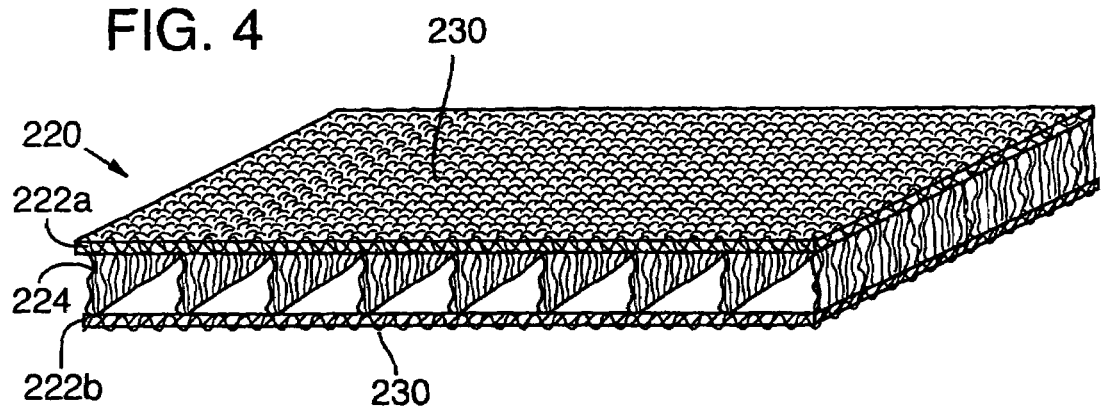
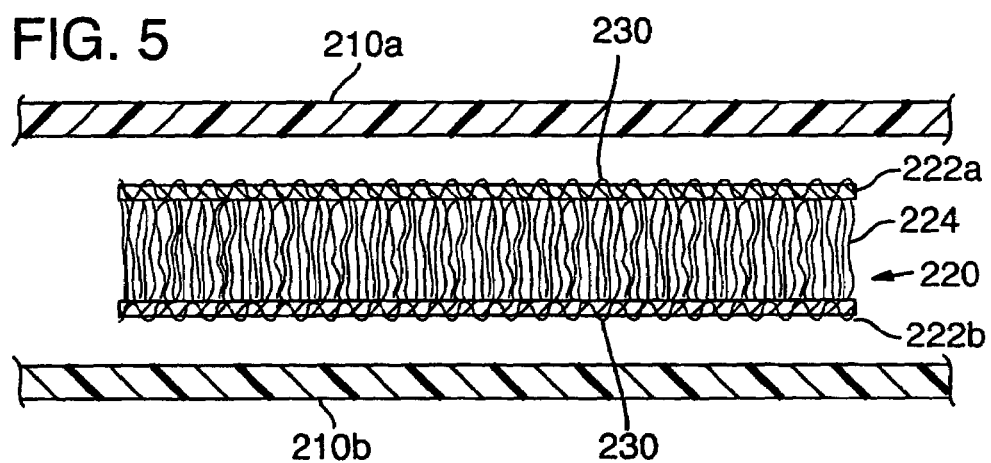

FLUID-FILLED BLADDER FOR AN ARTICLE OF FOOTWEAR

BACKGROUND OF THE INVENTION

1. Field of the Invention

This invention relates to a fluid-filled bladder suitable for footwear applications. More particularly, the invention is a fluid-filled bladder having a core that includes strands of fusing agent to secure the core to outer layers of the bladder.

2. Description of Background Art

Footwear is divided into two general parts, an upper and a sole. The upper is designed to comfortably receive the foot and the sole provides traction, protection, and a durable wear-resistant surface. The considerable forces generated during athletic activities require that the sole of footwear attenuate ground reaction forces and absorb energy, thereby providing protection to the foot and leg. Accordingly, the sole of athletic footwear typically has a layered structure that includes a comfort-enhancing insole, a resilient midsole, and a ground-contacting outsole that provides both durability and traction.

Midsoles are traditionally formed of conventional foam materials such as ethylene vinyl acetate or polyurethane that compress resiliently under an applied load to attenuate ground reaction forces and absorb energy. Conventional foam materials are resiliently compressible, in part, due to the inclusion of a plurality of open or closed cells that define an inner volume substantially displaced by gas. That is, the foam includes bubbles formed in the material that enclose gas. After repeated compressions, however, the cell structure deteriorates, thereby resulting in decreased compressibility of the foam. Thus, the force attenuation and energy absorption characteristics of the midsole may decrease over the lifespan of the footwear.

One way to overcome the drawbacks of utilizing conventional foam materials is disclosed in U.S. Pat. No. 4,183,156 to Rudy, hereby incorporated by reference, in which cushioning is provided by inflatable inserts formed of elastomeric materials. The inserts include a plurality of tubular chambers that extend substantially longitudinally throughout the length of the footwear. The chambers are in fluid communication with each other and jointly extend across the width of the footwear. U.S. Pat. No. 4,219,945 to Rudy, hereby incorporated by reference, discloses an inflated insert encapsulated in a foam material. The combination of the insert and the encapsulating material functions as a midsole. An upper is attached to the upper surface of the encapsulating material and an outsole or tread member is affixed to the lower surface.

Such bladders are generally formed of an elastomeric material and are structured to have an upper or lower surface that encloses one or more chambers therebetween. The chambers are pressurized above ambient pressure by inserting a nozzle or needle connected to a fluid pressure source into a fill inlet formed in the bladder. After the chambers are pressurized, the fill inlet is sealed, for example, by welding, and the nozzle is removed.

Bladders of this type have been manufactured by the prior art two-film technique in which two separate sheets of elastomeric film are formed having the overall peripheral shape of the bladder. The sheets are welded together along the periphery to form a bladder having upper, lower, and side surfaces, and the sheets are welded together at predetermined interior areas to give the bladder a desired configuration. That is, the interior welds provide the bladder with chambers having a predetermined shape and size at desired locations.

Bladders have also been manufactured by the prior art blow-molding technique, wherein a liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold, thereby forming a bladder with the desired shape and configuration.

Another type of prior art bladder used in soles of footwear is disclosed in U.S. Pat. Nos. 4,906,502 and 5,083,361, both to Rudy, and both hereby incorporated by reference. This type of bladder is formed as a fluid pressurized and inflated structure that comprises a hermetically sealed outer barrier layer which is securely fused substantially over the entire outer surfaces of a double-walled fabric core. The double-walled fabric core is comprised of first and second outer fabric layers that are normally spaced apart from one another at a predetermined distance. Connecting or drop yarns, potentially in the form of multi-filament yarns having many individual fibers, extend internally between the proximal or facing surfaces of the respective fabric layers. The filaments of the drop yarns form tensile restraining means and are anchored to the respective fabric layers. A suitable method of manufacturing the double walled fabric structure is double needle bar Raschel knitting.

U.S. Pat. Nos. 5,993,585 and 6,119,371, both issued to Goodwin et al., and both hereby incorporated by reference, disclose a bladder utilizing a double-walled fabric core, as with the '502 and '361 patents, but without a peripheral seam located midway between the upper and lower surfaces of the bladder. Instead, the seam is located adjacent to the upper surface of the bladder. Advantages in this design include removal of the seam from the area of maximum sidewall flexing and increased visibility of the interior of the bladder, including the connecting yarns. The process utilized to form a bladder of this type involves the formation of a shell, which includes a lower surface and a sidewall, with a mold. A double-walled fabric core is placed on top of a covering sheet, and the shell, following removal from the mold, is placed over the covering sheet and core. The assembled shell, covering sheet, and core are then moved to a lamination station where radio frequency energy fuses opposite sides of the core to the shell and covering sheet and fuses a periphery of the shell to the covering sheet. The bladder is then pressurized by inserting a fluid so as to place the connecting yarns in tension.

Another type of prior art bladder used in soles of footwear is disclosed in U.S. Pat. No. 4,874,640 to Donzis, and U.S. Pat. Nos. 5,741,568 and 6,127,010 to Rudy, all of which are hereby incorporated by reference. This type of bladder utilizes a compressible insert encapsulated within an elastomeric barrier member. In the '640 patent, the elastomeric barrier member is generally impermeable to air and generally filled with a fluid that can be pressurized. The insert includes a compression, impact absorbing foam core glued or fused on its external surfaces to the elastomeric barrier member. The internal foam cushioning member can be reinforced by including filaments, fibers, or fabrics within the foam core. The '568 and '101 patents suggest various materials can be used for the compressible insert, including cotton, rubber, foam, horsehair, plastic mesh, etc. A preferred material is identified as at least partially open cell, flexible foam, such as polyurethane or ethylene-vinyl acetate. Filaments are utilized to enhance the connection between the compressible insert and the barrier member, with portions of the filaments being imbedded in both the compressible insert and the barrier material. Examples of suitable filaments are listed as polyesters, polyethylene terephthalate, polyamides, nylons, fiberglass, carbon, glass, silk, cotton, wool, urethane, aramid, Dacron, cellulose, rayon, copra, acetate, polyvinyl alcohol, polyacrylics, and mixtures thereof.

While the cushioning benefits of bladders in articles of footwear are well documented, the prior art methods of manufacturing bladders utilizing a double-walled fabric core have made them costly and time consuming to manufacture. In particular, the double-walled fabric core is typically secured within the bladder by attaching a layer of thermally activated fusing agent to the outer surfaces of the core, and then heating the bladder components to cause the fusing agent to melt, thereby securing the core the outer layers of the bladder. In practice, it is time consuming to add the fusing agent to the outer surfaces of the core and requires additional manufacturing steps, thereby increasing overall cost. Accordingly, the art requires a simple, cost effective method for securing a double-walled fabric core within a bladder. In addition to other benefits that will become apparent from the following disclosure, the present invention fulfills this need.

SUMMARY OF THE INVENTION

The present invention relates to a fluid-filled bladder, and a method for forming a fluid-filled bladder, that is suitable for use with an article of footwear. The bladder includes an outer barrier and a core. The outer barrier is substantially impermeable to a fluid contained by the bladder. The core is located within the outer barrier and includes at least one fusing filament that fuses with the outer barrier and secures the core to the outer barrier.

Conventional cores were formed through a double needle bar Raschel knitting process. A sheet of fusing agent was then applied to the outer layers of the cores. The fusing filament of the present invention, however, may be integrated into the structure of the walls, through weaving for example, thereby eliminating the manufacturing step of applying the fusing agent to the outer layers.

The fusing filament and the barrier layers may be a thermoplastic material that is heated to a temperature that softens the material, but is below the melting point. Subsequent contact and cooling of the materials will effectively fuse the materials and secure the core to the barrier layers.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 4 is a perspective diagrammatic view of a material that forms a core in accordance with the present invention.

FIG. 5 is a cross-sectional view of the bladder, as depicted in FIG. 3, but prior to attachment of the core to the outer layers of the bladder.

DETAILED DESCRIPTION OF THE INVENTION

Figure 1:
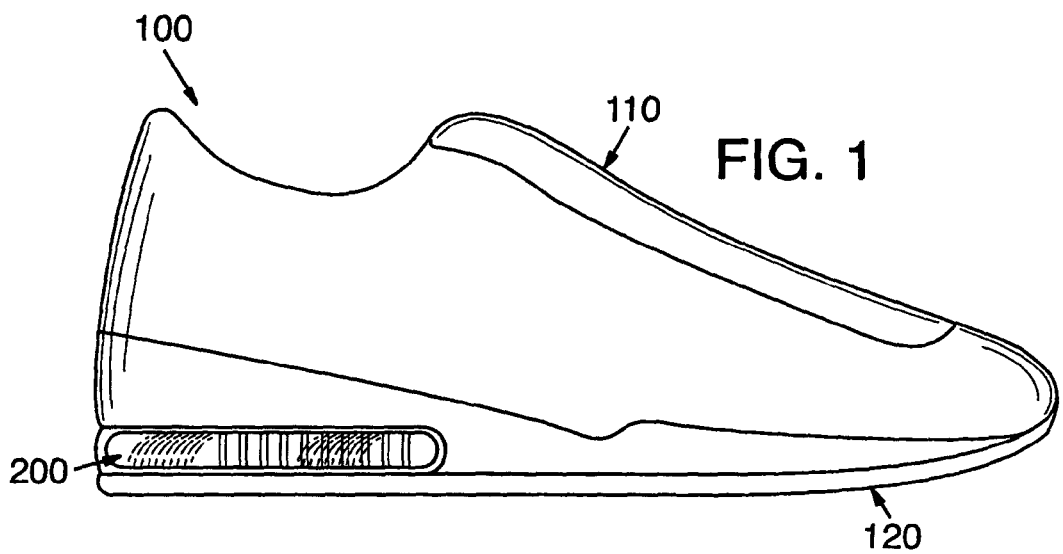
FIG. 1 is a lateral elevational view of an article of footwear having a bladder in accordance with the present invention.

Referring to the figures and following discussion, wherein like numerals indicate like elements, an article of footwear and a bladder in accordance with the present invention are disclosed. FIG. 1 depicts an article of footwear 100 having an upper 110 and a sole 120. A bladder 200 is located in a heel portion of sole 120 to provide enhanced ground reaction force attenuation and energy absorption. Article of footwear 100 is depicted as an athletic shoe. Bladder 200 may, however, be utilized in other types of footwear, including dress shoes, sandals, boots, and in-line skates.

Figure 2:
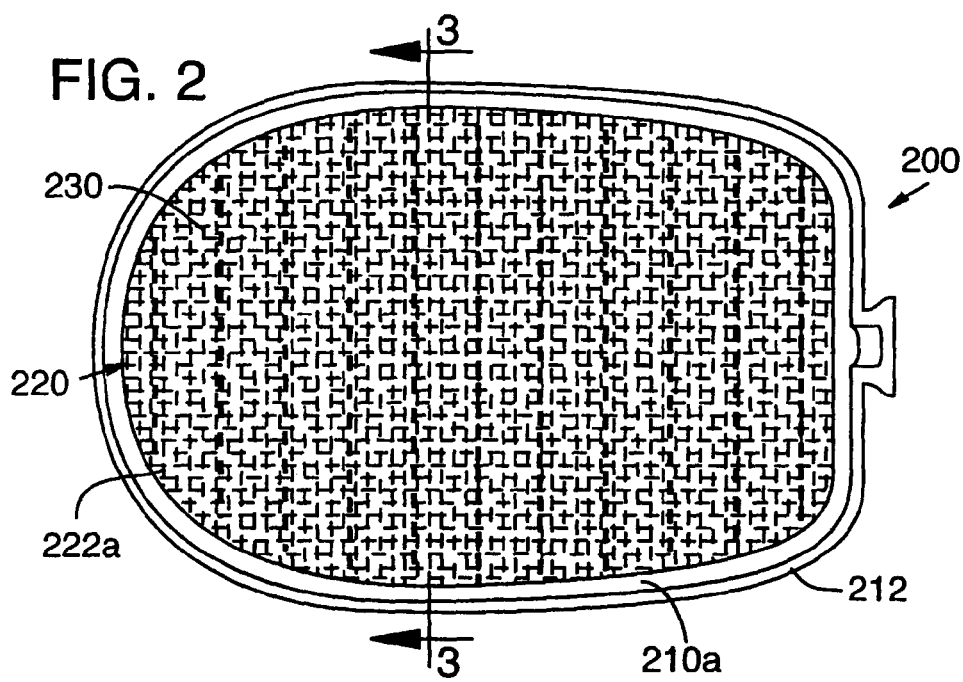
FIG. 2 is a top plan view of a bladder in accordance with the present invention.
Figure 3:
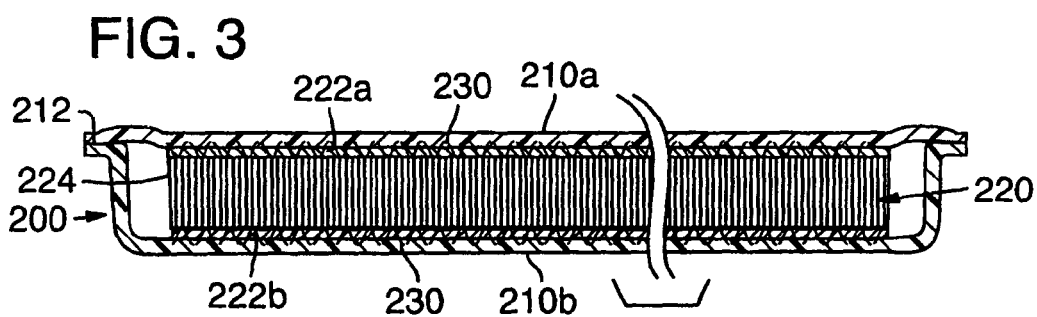
FIG. 3 is a cross-sectional view of the bladder as defined by line 3—3 in FIG. 2.

Bladder 200, depicted individually in FIGS. 2 and 3, includes an outer barrier, is formed of a first barrier layer 210a, a second barrier layer 210b, and a core 220 that is positioned between barrier layers 210a and 210b. First barrier layer 210a is attached to second barrier layer 210b around their respective peripheries to form a peripheral bond 212. Accordingly, barrier layers 210a and 210b and peripheral bond 212 form a sealed, fluid-filled chamber that encloses core 220.

Barrier layers 210a and 210b are formed of a thermoplastic elastomer material that is substantially impermeable to the fluid contained by bladder 200. The material forming barrier layers 210a and 210b may be, for example, a film formed of alternating layers of thermoplastic polyurethane and ethylene-vinyl alcohol copolymer, as disclosed in U.S. Pat. Nos. 5,713,141 and 5,952,065 to Mitchell et al, incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized for barrier layers 210a and 210b. Another suitable material is a flexible microlayer membrane that includes alternating layers of a gas barrier material and an elastomeric material, as disclosed in U.S. Pat. Nos. 6,082,025 and 6,127,026 to Bonk et al., hereby incorporated by reference. Other suitable thermoplastic elastomer materials or films include polyurethane, polyester, polyester polyurethane, polyether polyurethane, such as cast or extruded ester-based polyurethane film having a shore A hardness of 85–90, e.g., Tetra Plastics TPW-250. Additional suitable materials are disclosed in U.S. Pat. Nos. 4,183,156 and 4,219,945 to Rudy. Among the numerous thermoplastic urethanes that are useful in forming the film sheets are urethanes such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed. Nitrogen blocking barrier materials may also be utilized and include PVDC, also known as SURAN; nylon; EVOH; and PVDF, also known as KYNAR. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., hereby incorporated by reference.

Core 220 includes a first wall 222a that is normally spaced apart from a second wall 222b at a predetermined distance. A plurality of connecting members 224 extend between first wall 222a and second wall 222b. When a fluid pressurizes bladder 200, the fluid places an outward force on barrier layers 210a and 210b. The outward force extends connecting members 224, thereby placing connecting members 224 in tension and restraining further outward movement of barrier layers 210a and 210b. A material from which core 220 may be cut is depicted in FIG. 4. Connecting members 224 may be comprised of drop yarns that each include multiple tensile filaments that are anchored to first wall 222a and second wall 222b. One method of manufacturing core 220 is double needle bar Raschel knitting. A portion of first wall 222a and second wall 222b may be formed of air-bulked or otherwise texturized yarn, such as false twist texturized yarn having a combination of Nylon 6,6 and Nylon 6. Connecting members 224 may be formed of a similar material. As will be discussed in detail below, first wall 222a and second wall 222b also include fusing filaments. Although the thickness of core 220, which is measured when connecting members 224 are in a tensile state between first wall 222a and second wall 222b, may vary significantly within the scope of the present invention, a thickness that is suitable for footwear applications may range from 8 to 15 millimeters.

Connecting members 224 may have a denier per filament of approximately 1 to 20 with one suitable range being between 2 and 5. The individual tensile filaments that comprise connecting members 224 may exhibit a tensile strength of approximately 2 to 10 grams per denier and the number of tensile filaments per yarn ranges from approximately 1 to 100 with one suitable range being between 40 and 60. In general, there are approximately 1 to 8 yarns per tuft or strand and core 200 is knitted with approximately 200 to 1000 tufts or strands per square inch of fabric, with one suitable range being between 400 to 500 strands per square inch. The bulk density of the fabric is, therefore, in the range of about 20,000 to 300,000 fibers per square inch—denier.

Connecting members 224 may be arranged in rows that are separated by gaps. The use of gaps provides core 220 with increased compressibility in comparison to cores formed of double-walled fabrics that utilize continuous connecting yarns. The gaps may be formed during the double needle bar Raschel knitting process by omitting connecting yarns on certain predetermined needles in the warp direction. Knitting with three needles in and three needles out produces a suitable fabric with rows of connecting members 224 being separated by gaps. Other knitting patterns of needles in and needles out can be used, such as two in and two out, four in and two out, two in and four out, or any combination thereof. Also, the gaps may be formed in both a longitudinal and transverse direction by omitting needles in the warp direction or selectively knitting or not knitting on consecutive courses. Core 220, as depicted in FIG. 4, has relatively large gaps between connecting members 224. Alternatively, the gaps may be smaller or connecting members 224 may extend throughout core 220. The above-mentioned '585 and '371 Goodwin, et al patents disclose fabric bladder cores with gaps between rows of connecting members, while the '502 and '361 Rudy patents disclose fabric bladder cores with connecting members located throughout the core.

As discussed in the Description of Background Art section above, double-walled fabric cores are typically secured within an outer barrier of a bladder by attaching a layer of thermally activated fusing agent to the first wall and second wall of the core, and then heating the outer barrier, core, and fusing agent to cause the fusing agent to fuse the walls of the core to the outer barrier. The thermally activated fusing agent is typically a sheet of thermoplastic material that is heated and pressed into contact with the first wall and the second wall prior to placing the core between layers of the outer barrier. Although this process could be utilized to effectively secure core 220 and barrier layers 210a and 210b to each other, this process adds a manufacturing step and additional expense to the manufacturing process.

In contrast with the method discussed above, the present invention utilizes a plurality of fusing filaments 230 that are integrated into first wall 222a and second wall 222b, through weaving for example. Fusing filaments 230 are formed of a material that will fuse, bond, or otherwise become secured to barrier layers 210a and 210b when the various components of bladder 200 are heated and compressed together. Suitable materials for fusing filaments 230 include, therefore, thermoplastic polyurethane or any of the materials that are suitable for barrier layers 210a and 210b, as discussed above. Fusing filaments 230 may be woven or otherwise mechanically manipulated into walls 222a and 222b during the double needle bar Raschel knitting process or following the knitting process. Accordingly, fusing filaments 230 may be integrated into walls 222a and 222b during the manufacturing process of core 220, or fusing filaments 230 may be subsequently added to walls 222a and 222b.

The configuration of fusing filaments 230 and the manner in which fusing filaments 230 are integrated into walls 222a and 222b may vary greatly within the scope of the present invention. Fusing filaments 230 may be fibers, filaments, yarns, strips, or elements of material that are elongate and are integrated into first and second walls 222a and 222b. The term "fusing filaments" is, therefore, intended to encompass a broad range of types of material and material geometries that permit the material to be integrated into walls 222a and 222b. In contrast with the fusing agent utilized in prior art bladders, however, fusing filaments 230 are not sheets of material that are heat fused to the exterior surfaces of the core. FIGS. 2 and 4 depict fusing filaments as extending in a first, longitudinal direction and in a second direction that is transverse to the first direction. Fusing filaments 230 may also extend in only one direction, extend in a plurality of directions, or extend in random directions, for example. Fusing filaments can be incorporated into the first and second walls by any conventional mechanical manipulation technique such as interweaving, intertwining, and twisting or interlooping, with knitting being the most common method of interlooping. For example, as mentioned above, when core 220 is made by double needle bar Raschel knitting, filaments 230 are knit into the walls 220a and 220b. Thermoplastic polyurethane fibers are one suitable type of fusing filament. Examples of such fibers are Optimer Ecothane and BFG/Hualon manufactured by Optimer Performance Materials, Inc. of Wilmington, Del.

A method of attaching core 220 to barrier layers 210a and 210b, and thereby forming bladder 200, will now be discussed. As depicted in FIG. 5, core 220 is positioned between barrier layers 210a and 210b such that portions of fusing filaments 230 located along the outer surfaces of walls 220 are located adjacent to the inner surfaces of barrier layers 210a and 210b. At least barrier layers 210a and 210b and fusing filaments 230 are then heated and brought into contact such that fusing occurs between fusing filaments 230 and barrier layers 210a and 210b. Heating may be achieved through a variety of processes, including irradiating the components with radio frequency energy, compressing the components between platens of a hot press, positioning the components in a conventional radiant heater oven, ultrasonic welding, and UV direct heating, for example. Following heating, the components are cooled. In this manner, core 220 becomes effectively fused to barrier layers 210a and 210b.

The temperature to which barrier layers 210a and 210b and filaments 230 are heated depends upon the specific materials utilized for fusing filaments 230 and barrier layers 210a and 210b. In general, the materials of the barrier layers 210a and 210b and fusing filaments 230 should be heated to a degree that exceeds the softening temperature, but is below the melting point, thereby ensuring proper fusing. As noted above, barrier layers 210a and 210b and filaments 230 may be formed from a variety of materials. In addition, barrier layers 210a and 210b and filaments 230 may be formed from different materials. One suitable material for barrier layers 210a and 210b is alternating layers of thermoplastic polyurethane and ethylene-vinyl alcohol copolymer, which has a melting temperature between 350 and 360 degrees Fahrenheit. The temperature to which the first material should be heated is, therefore, between 300 and 320 degrees Fahrenheit. Another suitable material for barrier layers 210a and 210b is a flexible microlayer membrane that includes alternating layers of a gas barrier material and an elastomeric material, such as thermoplastic polyurethane, which also has a melting temperature in the range of 350 to 360 degrees Fahrenheit. A suitable temperature to which the second material may be heated is, however, between 320 and 335 degrees Fahrenheit. One skilled in the relevant art will recognize, therefore, that the proper heating temperature depends upon the materials that comprise barrier layers 210a and 210b and filaments 230.

Peripheral bond 212 is also formed by compressing and heat sealing barrier layers 210a and 210b together around substantially the entire periphery of core 220. Alternatively, barrier layer 210b may be preshaped to the configuration depicted in FIG. 3, and barrier layer 210a, which is in sheet form, may be attached to the peripheral edges and sealed, as disclosed in U.S. Pat. No. 5,993,585 to Goodwin et al. A fluid, preferably air, is then injected into the area encompassed by barrier layers 210a and 210b at a relatively high pressure, for example between 60 and 80 pounds per square inch, in order to pre-inflate and expand the core. The pressurized air is expired from the bladder and the intended permanent inflation gas is inserted at the desired pressure, for example from 5 to 30 pounds per square inch. Finally, the injection port is sealed, thereby pressurizing bladder 200. As depicted in FIGS. 2 and 3, peripheral bond 212 is substantially located on the plane of first barrier layer 210a. This configuration removes the seam from the are of maximum sidewall flexing and provides a more aesthetic structure in that the sidewall of bladder 200 is not obscured by a seam. Peripheral bond 212 may, however, be located on a plane that is located between barrier layers 210a and 210b. To assure that connecting member 224 adequately connects first and second walls 222a and 222b, and that walls 222a and 222b are adequately fused to barrier layers 210a and 210b, a peel test under ASTM T-Peel Test D1876 is performed. Peel strengths between 25 and 40 pounds per square inch are sufficient. As an alternative to the general method discussed above, a thermoforming technique may be utilized, as disclosed in U.S. patent application Ser. No. 09/995,003, entitled Method of Thermoforming a Bladder Structure and filed Nov. 26, 2001.

Bladder 200 gains a variety of advantages over prior art bladders. For example, the overall weight and stiffness (resistance to bending) of bladder 200 are reduced; material costs will decrease because a lesser quantity of fusing material is required; a more consistent bladder may be produced as a manufacturing step is eliminated; and process efficiency will increase due to the removal of the manufacturing step.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A fluid-filled bladder for an article of footwear, the bladder comprising:
    a flexible outer barrier that is substantially impermeable to a fluid contained by the bladder; and
    a core located within the outer barrier, the core including at least one fusing filament that is fused directly to the outer barrier and secures the core to the outer barrier, each of the outer barrier and the at least one fusing filament including thermoplastic polyurethane materials.

2. The fluid-filled bladder of claim 1, wherein the core includes a first wall structure that is spaced froth a second wall structure, the wall structures being joined by a plurality of connecting members.

3. The fluid-filled bladder of claim 2, wherein the core is manufactured through a double needle bar Raschel knitting process.

4. The fluid-filled bladder of claim 2, wherein the at least one fusing filament is integrated into the wall structures.

5. The fluid-filled bladder of claim 2, wherein the at least one fusing filament is mechanically manipulated into the first and second wall structures.

6. The fluid-filled bladder of claim 1, wherein the outer barrier is formed of a first barrier layer and a second barrier layer that are fused together around a periphery of the core.

7. A fluid-filled bladder for an article of footwear, the bladder comprising:
    a flexible outer barrier that is substantially impermeable to a fluid contained by the bladder; and
    a core located within the outer barrier, the core including a first wall structure that is spaced from a second wall structure, the wall structures being joined by a plurality of connecting members, and the core including at least one fusing filament that is integrated into the wall structures and is fused directly to the outer barrier to secure the core to the outer barrier, a material of the at least one fusing filament being the same as a material of the outer barrier.

8. The fluid-filled bladder of claim 7, wherein the at least one fusing filament is mechanically manipulated into the wall structures.

9. The fluid-filled bladder of claim 7, wherein the core is manufactured through a double needle bar Raschel knitting process.

10. The fluid-filled bladder of claim 7, wherein the at least one fusing filament and the outer barrier are formed of thermoplastic polyurethane materials.

11. The fluid-filled bladder of claim 7, wherein the outer barrier is formed of a first barrier layer and a second barrier layer that are fused together around a periphery of the core.

12. A fluid-filled bladder far an article of footwear, the bladder comprising:
an outer barrier and a core, the outer barrier being formed of a first barrier layer and a second barrier layer that are fused together around a periphery of the core, the outer barrier being substantially impermeable to a fluid contained by the bladder, and
the core being located within the outer barrier, the core including a first wall structure that is spaced from a second wall structure, the wall structures being joined by a plurality of connecting members, and the core including at least one fusing filament that is integrated into the wall structures and is fused directly to the outer barrier to secure the core to the outer barrier, each of the outer barrier and the at least one fusing filament including thermoplastic polyurethane materials.

13. The bladder of claim 12, wherein the at least one fusing filament is mechanically manipulated into the wall structures.

14. The bladder of claim 13, wherein the core is manufactured through a double needle bar Raschel knitting process.

15. A pressurized bladder for an article of footwear, the bladder comprising:
an outer barrier formed of a first sheet and a second sheet of thermoplastic material, the first sheet and the second sheet being joined at their respective peripheries to form a sealed chamber, the first sheet and the second sheet being substantially impermeable to a pressurized gas contained by the chamber at a pressure of at least 5 pounds per square inch; and
a core located within the chamber, the core including a first fabric layer attached to the first sheet and a second fabric layer attached to the second sheet, the first fabric layer and the second fabric layer being formed from yarns, and the first fabric layer and the second fabric layer being spaced apart and connected together by a plurality of connecting yarns that extend between the first fabric layer and the second fabric layer, and the first fabric layer and the second fabric layer each including fusing filaments formed of a thermoplastic material that is different than a material of the yarns and connecting yarns, the fusing filaments being mechanically manipulated into the first fabric layer and the second fabric layer over a sufficient surface area to form a fused attachment that secures the first fabric layer to the first sheet and secures the second fabric layer to the second sheet when the chamber is pressurized to at least 5 pounds per square inch with a peel strength of at least 5 pounds per linear inch between the fabric layers and the outer barrier, the fusing filaments being directly fused to the outer barrier.

16. The pressurized bladder of claim 15, wherein the core is manufactured through a double needle bar Raschel knitting process.

17. The pressurized bladder of claim 15, wherein the fusing filaments are formed from thermoplastic polyurethane.

18. A fluid-filled bladder far an article of footwear, the bladder comprising:
a flexible outer barrier that is substantially impermeable to a fluid contained by the bladder; and
a core located within the outer barrier, the core including at least one fusing filament that is fused directly to the outer barrier and secures the core to the outer barrier, a material of the fusing filament being the same as a material of the outer barrier.

19. The fluid-filled bladder of claim 18, wherein the core includes a first wall structure that is spaced from a second wall structure, the wall structures being joined by a plurality of connecting members.

20. The fluid-filled bladder of claim 19, wherein the core is manufactured through a double needle bar Raschel knitting process.

21. The fluid-filled bladder of claim 19, wherein the at least one fusing filament is integrated into the wall structures.

22. The fluid-filled bladder of claim 19, wherein the at least one fusing filament is mechanically manipulated into the first and second wall structures.

23. The fluid-filled bladder of claim 18, wherein the at least one fusing filament and the outer barrier are formed of thermoplastic materials fusing to one another.

24. The fluid-filled bladder of claim 18, wherein the at least one fusing filament is formed from thermoplastic polyurethane.

25. The fluid-filled bladder of claim 18, wherein the outer barrier is formed of a first barrier layer and a second barrier layer that are fused together around a periphery of the core.

* * * * *